(12) United States Patent
Shao et al.

(10) Patent No.: US 10,544,260 B2
(45) Date of Patent: Jan. 28, 2020

(54) FLUOROPOLYMERS, METHODS OF PREPARING FLUOROPOLYMERS, AND COATING COMPOSITIONS CONTAINING FLUOROPOLYMERS

(71) Applicant: PPG Industries Ohio, Inc., Cleveland, OH (US)

(72) Inventors: Jiping Shao, Sewickley, PA (US); Hongying Zhou, Allison Park, PA (US); Songwei Lu, Wexford, PA (US); Irina Schwendeman, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 104 days.

(21) Appl. No.: 15/690,580

(22) Filed: Aug. 30, 2017

(65) Prior Publication Data
US 2019/0062497 A1   Feb. 28, 2019

(51) Int. Cl.
*C08G 65/336* (2006.01)
*C09D 171/00* (2006.01)
*C09D 7/20* (2018.01)

(52) U.S. Cl.
CPC ............ *C08G 65/336* (2013.01); *C09D 7/20* (2018.01); *C09D 171/00* (2013.01); *C08G 2650/04* (2013.01); *C08G 2650/38* (2013.01); *C08G 2650/48* (2013.01)

(58) Field of Classification Search
CPC . C08G 65/336; C08G 2650/48; C09D 171/00
See application file for complete search history.

(56) References Cited

U.S. PATENT DOCUMENTS

| | | | |
|---|---|---|---|
| 3,798,251 A * | 3/1974 | Meiller | C07F 7/12 556/440 |
| 4,804,709 A | 2/1989 | Takago et al. | |
| 4,851,475 A | 7/1989 | Federici et al. | |
| 5,314,981 A | 5/1994 | Takago et al. | |
| 6,183,872 B1 | 2/2001 | Tanaka et al. | |
| 6,277,485 B1 | 8/2001 | Invie et al. | |
| 6,361,870 B1 | 3/2002 | Steffl et al. | |
| 6,613,860 B1 | 9/2003 | Dams et al. | |
| 6,649,272 B2 | 11/2003 | Moore et al. | |
| 6,656,258 B2 | 12/2003 | Elsbernd et al. | |
| 6,716,534 B2 | 4/2004 | Moore et al. | |
| 6,899,955 B2 | 5/2005 | Lines et al. | |
| 7,097,910 B2 | 8/2006 | Moore et al. | |
| 7,196,212 B2 | 3/2007 | Yamaguchi et al. | |
| 7,268,197 B2 | 9/2007 | Moore et al. | |
| 7,439,279 B2 | 10/2008 | Kondo et al. | |
| 7,485,693 B2 | 2/2009 | Matsuda et al. | |
| 7,514,479 B2 | 4/2009 | Kondo | |
| 7,652,115 B2 | 1/2010 | Dams et al. | |
| 7,652,117 B2 | 1/2010 | Clark et al. | |
| 7,659,351 B2 | 2/2010 | Caldwell et al. | |
| 7,781,604 B2 | 8/2010 | Sakano et al. | |
| 7,803,894 B2 | 9/2010 | Dams et al. | |
| 7,825,272 B2 | 11/2010 | Iyer et al. | |

(Continued)

FOREIGN PATENT DOCUMENTS

| CN | 101679804 A | 3/2010 |
|---|---|---|
| CN | 1902249 B | 6/2010 |

(Continued)

OTHER PUBLICATIONS

Scientific Party Deep Sea Drilling Project, Leg 46, "Glass-rich basaltic sand and gravel within the oceanic crust at 22° N", Nature, 1976, 262, 768-770 (Year: 1976).*

Perumal et al., "Fluoropolymer Synthesis and Its Application as a Mold Material in UV-Nano-Imprint Lithography Process", Journal of Nanoscience and Nanotechnology, 2008, vol. 8:10, pp. 5341-5346.

Block et al,. "Advancements Towards Clean Surfaces", Proc. European Coatings Congress, Nurnberg, 2011: 1-8.

(Continued)

*Primary Examiner* — Nicole M. Buie-Hatcher
(74) *Attorney, Agent, or Firm* — Justin Martinchek

(57) ABSTRACT

A fluoropolymer having fluoropolyether linkages, at least two ester linkages, and hydrolyzable functional groups is represented by chemical structure (I):

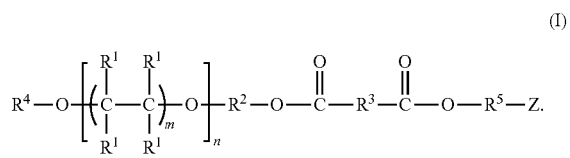

With respect to chemical structure (I), m is a number from 1 to 4 and n is a number from 10 to 60, each $R^1$ is independently fluorine or $CF_3$, $R^2$ is an alkylene group, $R^3$ is an alkylene group in which one or more hydrogens of the alkylene group are optionally substituted with fluorine, $R^4$ is an alkyl group in which one or more hydrogens of the alkyl group are substituted with fluorine, $R^5$ is an alkylene group in which at least one hydrogen of the alkylene group is substituted with a group comprising $CF_3$, $CF_2H$, or a hydrolyzable silyl group, and Z is a group represented by chemical structure (II),

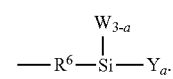

Methods of preparing the fluoropolymer and coating compositions containing the fluoropolymer are also included.

18 Claims, No Drawings

(56) References Cited

U.S. PATENT DOCUMENTS

| | | | |
|---|---|---|---|
| 7,829,649 | B2 | 11/2010 | Yamane et al. |
| 7,842,389 | B2 | 11/2010 | Ohashi et al. |
| 7,855,256 | B2 | 12/2010 | Shiono |
| 7,897,678 | B2 | 3/2011 | Qin |
| 8,013,096 | B2 | 9/2011 | Yamane et al. |
| 8,263,724 | B2 | 9/2012 | Yamane et al. |
| 8,420,281 | B2 | 4/2013 | Qiu et al. |
| 8,420,763 | B2 | 4/2013 | Yamane et al. |
| 8,664,421 | B2 | 3/2014 | Itami et al. |
| 8,900,711 | B2 | 12/2014 | Yamane et al. |
| 9,346,961 | B2 | 5/2016 | Shiraiwa et al. |
| 9,388,315 | B2 | 7/2016 | Hoshino |
| 9,523,004 | B2 * | 12/2016 | Hervieu ................. C09D 5/006 |
| 2002/0192380 | A1 | 12/2002 | Elsbernd et al. |
| 2005/0054804 | A1 | 3/2005 | Dams et al. |
| 2005/0121644 | A1 | 6/2005 | Dams et al. |
| 2005/0143541 | A1 | 6/2005 | Caldwell et al. |
| 2005/0194588 | A1 | 9/2005 | Sasaki et al. |
| 2007/0100043 | A1 | 5/2007 | Shiono |
| 2007/0275193 | A1 | 11/2007 | DeSimone et al. |
| 2008/0021128 | A1 | 1/2008 | Haubrich et al. |
| 2008/0220264 | A1 * | 9/2008 | Iyer .......................... C09D 4/00 |
| | | | 428/447 |
| 2009/0155581 | A1 | 6/2009 | Lee |
| 2009/0198000 | A1 | 8/2009 | Weinelt et al. |
| 2009/0208728 | A1 | 8/2009 | Itami et al. |
| 2010/0028682 | A1 | 2/2010 | Shinohara |
| 2010/0105828 | A1 * | 4/2010 | Iyer .................... C08G 18/2885 |
| | | | 524/588 |
| 2010/0324205 | A1 | 12/2010 | Maier et al. |
| 2012/0237777 | A1 | 9/2012 | Lu |
| 2013/0108876 | A1 | 5/2013 | Komori et al. |
| 2013/0136928 | A1 | 5/2013 | Yamane et al. |
| 2014/0147680 | A1 | 5/2014 | Yamane et al. |
| 2014/0234579 | A1 | 8/2014 | Wang et al. |
| 2014/0287200 | A1 | 9/2014 | Ito et al. |
| 2014/0309329 | A1 | 10/2014 | Sawada et al. |
| 2016/0237199 | A1 | 8/2016 | Yoshida et al. |
| 2016/0237614 | A1 | 8/2016 | Kawabe et al. |
| 2016/0340544 | A1 * | 11/2016 | Katsukawa ............... C07F 7/10 |
| 2017/0283316 | A1 | 10/2017 | Meuler et al. |
| 2017/0342210 | A1 * | 11/2017 | Mitsuhashi ............ C09K 3/18 |
| 2019/0062592 | A1 * | 2/2019 | Shtarov ............. C09D 171/02 |

FOREIGN PATENT DOCUMENTS

| | | | |
|---|---|---|---|
| CN | 103739814 | A | 4/2014 |
| CN | 104861149 | A | 8/2015 |
| DE | 102008012895 | A1 | 9/2009 |
| EP | 0797111 | A2 * | 9/1997 ........... C08G 65/007 |
| EP | 0870769 | A2 | 10/1998 |
| EP | 1377643 | B1 | 11/2005 |
| EP | 2164912 | B1 | 7/2011 |
| JP | 7330378 | A | 12/1995 |
| JP | 2000256375 | A | 9/2000 |
| JP | 2003277735 | A | 10/2003 |
| JP | 2004155983 | A | 6/2004 |
| JP | 2005008878 | A | 1/2005 |
| JP | 2005046767 | A | 2/2005 |
| JP | 200582700 | A | 3/2005 |
| JP | 3635857 | B2 | 4/2005 |
| JP | 2005350404 | A | 12/2005 |
| JP | 2008308628 | A | 12/2008 |
| JP | 4215889 | B2 | 1/2009 |
| JP | 4273362 | B1 | 6/2009 |
| JP | 2009132826 | A | 6/2009 |
| JP | 2009215366 | A | 9/2009 |
| JP | 2010138112 | A | 6/2010 |
| JP | 201395817 | B1 | 5/2013 |
| JP | 201470163 | A | 4/2014 |
| KR | 1020150054148 | A | 5/2015 |
| KR | 101539262 | B1 | 7/2015 |
| WO | 2006137726 | A2 | 12/2006 |
| WO | 2009008380 | A1 | 1/2009 |
| WO | 2009015258 | A1 | 1/2009 |
| WO | WO-2010144398 | A2 * | 12/2010 ............. C09K 8/588 |
| WO | 2013146112 | A1 | 10/2013 |
| WO | 2014135353 | A1 | 9/2014 |
| WO | 2015033805 | A1 | 3/2015 |
| WO | 2015051053 | A1 | 4/2015 |
| WO | 2015056744 | A1 | 4/2015 |
| WO | 2015087903 | A1 | 6/2015 |
| WO | 2015115522 | A1 | 8/2015 |
| WO | 2015142894 | A2 | 9/2015 |
| WO | 2015146861 | A1 | 10/2015 |
| WO | 2015190526 | A1 | 12/2015 |

OTHER PUBLICATIONS

Block et al., "Grime prevention: Hybrid coatings facilitate easy removal of contamination", Europ. Coatings J., 2009, vol. 11, pp. 38-42.

Jones, "Fluoropolymers for Coating Applications", JCT CoatingsTech, 2008, vol. 5:9, pp. 44-48.

* cited by examiner

FLUOROPOLYMERS, METHODS OF PREPARING FLUOROPOLYMERS, AND COATING COMPOSITIONS CONTAINING FLUOROPOLYMERS

FIELD OF THE INVENTION

The present invention relates to fluoropolymers, methods of preparing fluoropolymers, and coating compositions containing fluoropolymers.

BACKGROUND OF THE INVENTION

Consumer electronic devices such as cellular phones, notebook monitors, television screens, and the like are readily marked with fingerprints when handled. For instance, the glass surface of a cellular phone, which is contacted with the hands and fingers, becomes readily marked with oils. To prevent or reduce the amount of marks and smudges, a fingerprint resistant coating is often applied to the surface of consumer electronic devices. In addition to fingerprint resistant properties, these coatings should also allow for easy removal of marks and smudges that are formed on the surface of the substrate. As such, it is desirable to provide improved coatings that more effectively mask or prevent fingerprint marks and smudges on the surface of substrates, such as the surface of consumer electronic devices, and which also allow for easy cleaning of marks and smudges that are formed.

SUMMARY OF THE INVENTION

The present invention relates to a fluoropolymer comprising fluoropolyether linkages, at least two ester linkages, and at least one hydrolyzable functional groups. Further, the fluoropolymer of the present invention is represented by chemical structure (I):

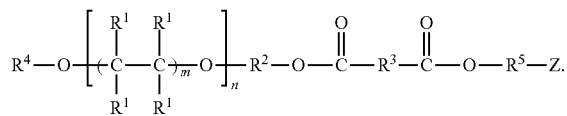

With respect to chemical structure (I), m is a number from 1 to 4 and n is a number from 10 to 60, each $R^1$ is independently fluorine or $CF_3$, $R^2$ is an alkylene group, $R^3$ is an alkylene group in which one or more hydrogens of the alkylene group are optionally substituted with fluorine, $R^4$ is an alkyl group in which one or more hydrogens of the alkyl group are substituted with fluorine, $R^5$ is an alkylene group in which at least one hydrogen of the alkylene group is substituted with a group comprising $CF_3$, $CF_2H$, or a hydrolyzable silyl group, and Z is a group represented by chemical structure (II),

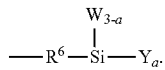

Moreover, with respect to chemical structure (II), a is a number from 1 to 3, $R^6$ is an alkylene group that is interrupted by an oxygen atom, W is a $C_1$ to $C_4$ alkyl group, and Y is a hydrolyzable group.

The present invention further relates to a method of preparing a fluoropolymer comprising: (i) reacting a fluoropolyether comprising a hydroxyl group with a dicarboxylic acid anhydride to produce a fluoropolyether comprising a carboxylic acid group; (ii) reacting the fluoropolyether comprising the carboxylic acid group with a hydrolyzable silane comprising an epoxy group to produce a fluoropolyether comprising a hydroxyl group and a hydrolyzable silyl group; and (iii) reacting the fluoropolyether comprising the hydroxyl group and the hydrolyzable silyl group with: (a) a hydrolyzable silane comprising an isocyanate group; (b) a fluorinated compound comprising a chlorine, bromine, or iodine bonded to a silicon atom; or (c) an anhydride compound comprising $CF_3$ groups, $CF_2H$ groups, or combinations thereof.

In addition, the present relates to a coating composition comprising the fluoropolymer of the present invention and a non-aqueous solvent.

The present invention also relates to a substrate at least partially coated with a coating formed from a coating composition according to the present invention.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" fluoropolymer, "a" coating composition, and the like refer to one or more of any of these items.

The following examples are presented to demonstrate the general principles of the invention. The invention should not be considered as limited to the specific examples presented. All parts and percentages in the examples are by weight unless otherwise indicated.

As indicated, the present relates to a fluoropolymer. As used herein, a "fluoropolymer" refers to a polymer derived from one or more monomers with at least one of the monomers having at least one pendant fluorine substituent. As used herein, the term "polymer" refers to oligomers and homopolymers (e.g., prepared from a single monomer species), copolymers (e.g., prepared from at least two monomer species), and graft polymers. The term "resin" is used interchangeably with "polymer." The fluoropolymer described herein can be used to form a film. A "film-forming resin" refers to resins that can form a self-supporting continuous film on at least a horizontal surface of a substrate upon removal of any diluents or carriers present in the composition.

The fluoropolymer of the present invention includes fluoropolyether linkages, ester linkages, and hydrolyzable functional groups. A "fluoropolyether" refers to a group having two hydrocarbon groups linked with an oxygen atom in which at least one of the hydrocarbon groups has at least one hydrogen atom replaced with a fluorine atom or a $CF_3$ group. Further, a "fluoropolyether linkage" refers to a fluoropolyether formed between two molecules or groups during polymerization.

An "ester linkage" refers to an ester group represented by —C(=O)—O— that is formed between two molecules or groups such as during polymerization. The fluoropolymer of the present invention can comprise at least two ester linkages. As explained in further detail herein, the fluoropolymer of the present invention can include additional linkages including, but not limited to, ether linkages, urethane linkages, and combinations thereof. An "ether linkage" refers to an ether group represented by —R—O—R'— that is formed between two molecules or groups such as during polymerization and in which each R is independently an alkyl or alkylene group. A "urethane linkage" refers to a urethane group represented by —O—C(=O)—NH— that is formed between two molecules or groups such as during polymerization.

Further, a "hydrolyzable group" refers to a group which either is directly capable of undergoing condensation reactions or which is capable of hydrolyzing to form a compound which is capable of undergoing condensation reactions. Non-limiting examples of hydrolyzable groups include a halide such as chloride, bromide, and iodide, a $C_1$-$C_6$ or $C_1$-$C_4$ alkoxy group such as a methoxy group, or a polyoxyalkylene group. The term "alkoxy" refers to an —O-alkyl group. When the alkoxy group is bonded to a silicon atom, the Si-alkoxy group can be referred to as an alkoxysilane.

As used herein, a "silane" refers to a compound derived from $SiH_4$ by substituting organic groups for one or more of the hydrogen. A "hydrolyzable silane" refers to a silane in which the silicon atom is bonded to at least one hydrolyzable group. A non-limiting example of a hydrolyzable silane is an alkoxysilane in which at least one hydrogen, such as all hydrogens for example, is an alkoxy group bonded to the silicon atom.

Further, a "silyl group" refers to a —$SiR_3$ in which each R is independently a hydrocarbon such as an alkyl. A "hydrolyzable silyl group" refers to a silyl group in which the silicon atom is bonded to at least one hydrolyzable group. That is, at least one R attached to the silicon atom is a hydrolyzable group. A non-limiting example of a hydrolyzable silyl group is an alkoxysilyl group in which at least one R, such as all R groups for example, is an alkoxy group bonded to the silicon atom.

The fluoropolymer of the present can be represented by chemical structure (I):

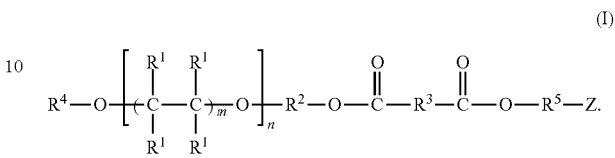

With respect to chemical structure (I), m is a number from 1 to 4 and n is a number from 10 to 60, each $R^1$ is independently fluorine or $CF_3$, $R^2$ is an alkylene group, $R^3$ is an alkylene group in which one or more hydrogens of the alkylene group are optionally substituted with fluorine, $R^4$ is an alkyl group in which one or more hydrogens, such as one hydrogen, of the alkyl group are substituted with fluorine, $R^5$ is an alkylene group in which at least one hydrogen of the alkylene group is substituted with a group comprising $CF_3$, $CF_2H$, or a hydrolyzable silyl group, and Z is a group represented by chemical structure (II),

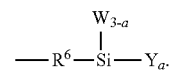

Moreover, with respect to chemical structure (II), a is a number from 1 to 3, $R^6$ is an alkylene group that is interrupted by an oxygen atom, W is a $C_1$ to $C_4$ alkyl group, and Y is a hydrolyzable group such as an alkoxy group.

As used herein, an "alkyl group" refers to a linear, branched, and/or cyclic monovalent, saturated hydrocarbon radical. The alkyl group may include, but is not limited to, a linear or branched $C_1$-$C_{30}$ monovalent hydrocarbon radical, or a linear or branched $C_1$-$C_{20}$ monovalent hydrocarbon radical, or a linear or branched $C_1$-$C_{10}$ monovalent hydrocarbon radical, or a linear or branched $C_1$ to $C_6$ monovalent hydrocarbon radical, or a linear or branched $C_2$ to $C_4$ monovalent hydrocarbon radical, such as ethyl. The alkyl group may also include, but is not limited to, a cyclic $C_3$-$C_{19}$ monovalent hydrocarbon radical, or a cyclic $C_3$-$C_{12}$ monovalent hydrocarbon radical, or a cyclic $C_5$-$C_7$ monovalent hydrocarbon radical. Further, and as indicated above, the alkyl group can optionally comprise an interrupting heteroatom, a functional group, or a combination thereof. For example, the alkyl group can be interrupted by: (i) a heteroatom including, but not limited to, an oxygen atom, a nitrogen atom, a sulfur atom, or a combination thereof; and/or (ii) a functional group including, but not limited to, an ester group, an ether group, a carbonyl group, an amide group, an amino group, or combinations thereof. Alternatively, the alkyl group can be free of interrupting heteroatoms and/or functional groups.

The term "alkylene" refers to a linear, branched, and/or cyclic divalent, saturated hydrocarbon radical. The alkylene group may include, but is not limited to, a linear or branched $C_1$-$C_{30}$ divalent hydrocarbon radical, or linear or branched $C_1$-$C_{20}$ divalent hydrocarbon radical, or linear or branched $C_1$-$C_{10}$ divalent hydrocarbon radical, or a linear or branched $C_1$ to $C_6$ divalent hydrocarbon radical, or a linear or branched $C_2$ to $C_4$ divalent hydrocarbon radical. The alkylene group may also include, but is not limited to, a cyclic $C_3$-$C_{19}$ divalent hydrocarbon radical, or a cyclic $C_3$-$C_{12}$ divalent hydrocarbon radical, or a cyclic $C_5$-$C_7$ divalent hydrocarbon radical. Further, the alkylene group can optionally comprise an interrupting heteroatom, a functional group, or a combination thereof. The interrupting heteroatom and functional group can include, but is not limited to, any of the heteroatoms and functional groups previously described. For instance, the alkylene group can comprise interrupting oxygen atoms that form ether linkages. Alternatively, the alkyl group can be free of additional interrupting heteroatoms and/or functional groups other than those described in chemical structure (I).

The term "linear" refers to a compound having a straight hydrocarbon chain, the term "branched" refers to a compound having a hydrocarbon chain with a hydrogen replaced by a substituent such as an alkyl group that branches or extends out from a straight chain, and the term "cyclic" refers to a closed ring structure. The cyclic groups also encompass bridged ring polycycloalkyl groups (or bridged ring polycyclic groups) and fused ring polycycloalkyl groups (or fused ring polycyclic groups).

As previously described, the fluoropolymer of the present invention includes fluoropolyether linkages. Referring to chemical structure (I), the fluoropolyether linkages are represented by

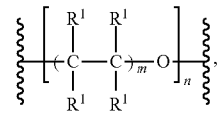

in which m is a number from 1 to 4, such as 1, n is a number from 10 to 60, and each $R^1$ is independently fluorine or $CF_3$. In some examples, all of the substituents represented by $R^1$ are fluorine or $CF_3$, such as fluorine. Alternatively, at least some of the substituents represented by $R^1$ are fluorine, while the remaining substituents represented by $R^1$ are $CF_3$.

As further defined by chemical structure (I), the fluoropolymer of the present invention can have various substituents that contain fluorine atoms other than the fluoropolyether linkages. For instance, at least one hydrogen atom, or all the hydrogen atoms, of the alkylene group of $R^3$ can be substituted with fluorine such as perfluoropropylene. Similarly, at least one hydrogen atom, or all the hydrogen atoms, of the alkyl group of $R^4$ can be substituted with fluorine, such as perfluoroethyl. Alternatively, the alkylene group of $R^3$, the alkyl group of $R^4$, or both can be completely free of fluorine atoms.

Further, with respect to chemical structure (I), $R^5$ is an alkylene group in which at least one hydrogen is substituted with a group comprising $CF_3$, $CF_2H$, or a hydrolyzable silyl group. A non-limiting example of a group comprising a $CF_3$ or $CF_2H$ that can be used as $R^5$ is represented by chemical structure (III):

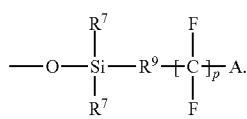

With respect to chemical structure (III), p is a number from 1 to 8 such as from 1 to 6 or 1 to 5 or 1 to 4, $R^9$ is an alkylene group, each $R^7$ is independently an alkyl group, and A is $CF_3$ or $CF_2H$.

Another non-limiting example of a group comprising a $CF_3$ or $CF_2H$ that can be used as $R^5$ is represented by chemical structure (IV):

With respect to chemical structure (IV), B is $CF_3$ or $CF_2H$.

Further, a non-limiting example of a group comprising a hydrolyzable silyl group that can be used as $R^5$ is represented by chemical structure (V):

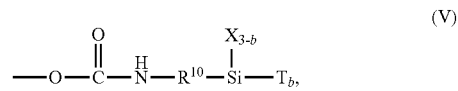

With respect to chemical structure (V), b is a number from 1 to 3, $R^{10}$ is an alkylene group, X is a $C_1$ to $C_4$ alkyl group, and T is a hydrolyzable group such as an alkoxy group.

As described by chemical structure (I), the fluoropolymer of the present invention can have various substituents that contain fluorine atoms other than the fluoropolyether linkages. For instance, at least one hydrogen atom, or all the hydrogen atoms, of the alkylene group of $R^3$ can be substituted with fluorine. Similarly, at least one hydrogen atom, or all the hydrogen atoms, of the alkyl group of $R^4$ can be substituted with fluorine. Alternatively, the alkylene group of $R^3$, the alkyl group of $R^4$, or both are completely free of fluorine atoms.

Moreover, and as previously described, the fluoropolymer of the present invention includes one or more hydrolyzable functional groups. With respect to chemical structure (I), at least one of the hydrolyzable functional groups is provided by substituent Z which is a group represented by chemical structure (II),

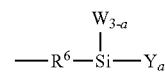

(where a is a number from 1 to 3, $R^6$ is an alkylene group that is interrupted by an oxygen atom, W is a $C_1$ to $C_4$ alkyl group, and Y is a hydrolyzable group). In some non-limiting examples, each Y is an alkoxy group bonded to the silicon atom, thereby forming an alkoxysilyl group. For instance, each Y can be an alkoxy group and a can be 1, 2, or 3 to form mono-alkoxysilyl structure, a di-alkoxysilyl structure, or a tri-alkoxysilyl structure, respectively. In some examples, a is 3 and Y is a methoxy group to form a trimethoxysilyl group.

The fluoropolymer can also be completely free of other groups and substituents not previously described with respect to chemical structure (I). For example, the fluoropolymer of the present invention can be completely free of siloxane units. As used herein, "siloxane units" refers to Si—O—Si units.

In some non-limiting examples, the fluoropolymer is represented by chemical structure (I) in which each $R^1$ is independently fluorine, $R^2$ is an alkylene group, $R^3$ is an alkylene group completely free of fluorine atoms, $R^4$ is an alkyl group in which all the hydrogens of the alkyl group are substituted with fluorine, $R^5$ is an alkylene group in which one hydrogen is substituted with a group represented by chemical structure (V), and Z is a group represented by chemical structure (II),

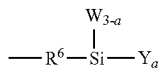

in which a is 3, $R^6$ is an alkylene group that is interrupted by an oxygen atom, and each Y is an alkoxy group, such as a $C_1$-$C_4$ alkoxy group, for example a methoxy group. A non-limiting example of such a fluoropolymer is represented by the following chemical structure:

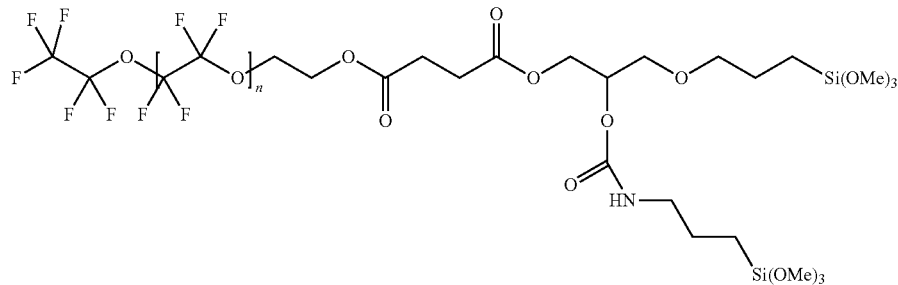

The fluoropolymer, in another non-limiting example, can also be represented by chemical structure (I) in which each $R^1$ is independently fluorine, $R^2$ is an alkylene group, $R^3$ is an alkylene group completely free of fluorine atoms, $R^4$ is an alkyl group in which all the hydrogens of the alkyl group are substituted with fluorine, $R^5$ is an alkylene group in which one hydrogen is substituted with a group represented by chemical structure (III), and Z is a group represented by chemical structure (II),

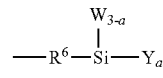

in which a is 3, $R^6$ is an alkylene group that is interrupted by an oxygen atom, and each Y is an alkoxy group, such as a $C_1$-$C_4$ alkoxy group, for example a methoxy group. A non-limiting example of such a fluoropolymer is represented by the following chemical structure:

The fluoropolymer, in a non-limiting example, can also be represented by chemical structure (I) in which each $R^1$ is independently fluorine, $R^2$ is an alkylene group, $R^3$ is an alkylene group completely free of fluorine atoms, $R^4$ is an alkyl group in which all the hydrogens of the alkyl group are substituted with fluorine, $R^5$ is an alkylene group in which one hydrogen is substituted with a group represented by chemical structure (IV), and Z is a group represented by chemical structure (II),

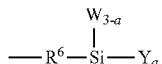

in which a is 3, $R^6$ is an alkylene group that is interrupted by an oxygen atom, and each Y is an alkoxy group, such as a $C_1$-$C_4$ alkoxy group, for example a methoxy group. A non-limiting example of such a fluoropolymer is represented by the following chemical structure:

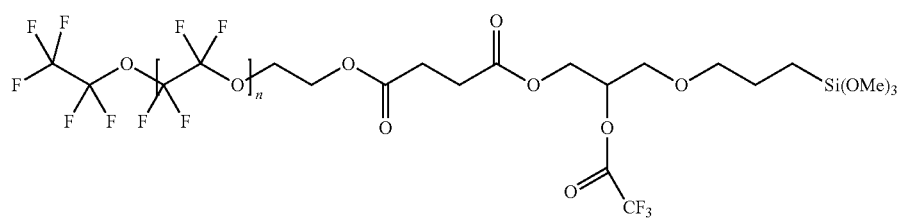

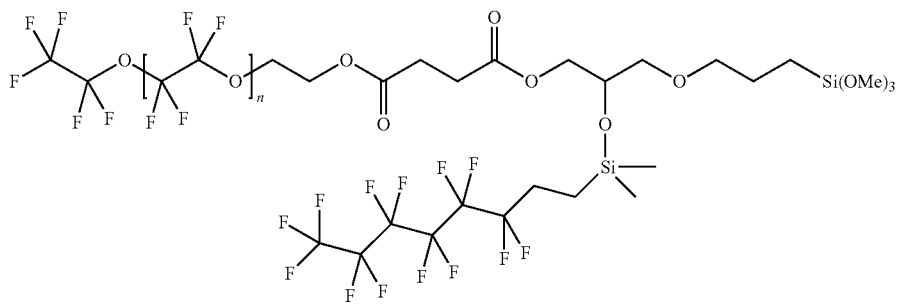

It is appreciated that the fluoropolymer can include various other structures as described in chemical structure (I) in accordance with the present invention.

The present invention also relates to a method of making the previously described fluoropolymers represented by chemical structure (I). The method includes first reacting a fluoropolyether comprising a hydroxyl group with an anhydride compound. The fluoropolyether used in the method of the present invention is a mono-hydroxyl functional compound. The mono-hydroxyl functional fluoropolyether can be represented, for example, by

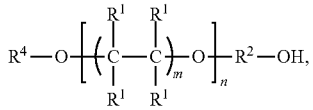

in which n is a number from 10 to 60, each $R^1$ is independently fluorine or $CF_3$, R is an alkylene group, and $R^4$ is an alkyl group in which one or more hydrogens of the alkyl group are substituted with fluorine. In a non-limiting example, each $R^1$ is independently fluorine, $R^2$ is an alkylene group, and $R^4$ is an alkyl group in which all the hydrogens of the alkyl group are substituted with fluorine.

The anhydride reacted with the hydroxyl functional fluoropolyether is derived from a dicarboxylic acid. The dicarboxylic acid can be selected from linear, branched, and/or cyclic dicarboxylic acids. The cyclic groups can include aliphatic cyclic groups or aromatic cyclic groups. As used herein, an "aromatic group" refers to a cyclically conjugated hydrocarbon with a stability (due to delocalization) that is significantly greater than that of a hypothetical localized structure. Further, the term "aliphatic" refers to non-aromatic straight, branched, or cyclic hydrocarbon structures that contain saturated carbon bonds.

Non-limiting examples suitable anhydrides include succinic anhydride, glutaric anhydride, hexahydrophthalic anhydride, methyl-hexahydrophthalic anhydride, and combinations thereof.

The anhydride can also include, or is modified to include, fluorine atoms. For instance, the anhydride can include a cyclic anhydride comprising pendant fluorine atoms. Non-limiting examples of suitable cyclic anhydrides comprising pendant fluorine atoms include tetrafluorosuccinic anhydride and hexafluoroglutaric anhydride.

The hydroxyl functional fluoropolyether and anhydride can also be reacted under heat such as at a temperature within a range from 100° C. to 130° C. For example, the hydroxyl functional fluoropolyether can be reacted with the anhydride at a temperature of 120° C. until IR spectroscopy shows the absence of the characteristic anhydride band (1785 cm-1) using a ThermoScientific Nicolet iS5 FT-IR. It is appreciated that the reaction product produced from the hydroxyl functional fluoropolyether and anhydride is a fluoropolyether comprising a carboxylic acid group. The resulting fluoropolyether also includes at least one ester linkage.

After forming the carboxylic acid functional fluoropolyether, the fluoropolyether is reacted with a hydrolyzable silane comprising an epoxy group. The hydrolyzable silane comprising an epoxy group can comprise any of the previously described hydrolyzable groups attached to a silicon atom such as an alkoxy group, such a $C_1$-$C_4$ alkoxy group, for example, to thereby form an alkoxysilane. The hydrolyzable silane comprising an epoxy group can also include other functional groups and/or linkages such an as ether linkage.

A non-limiting example of a suitable hydrolyzable silane comprising the epoxy group is represented by chemical structure (VI):

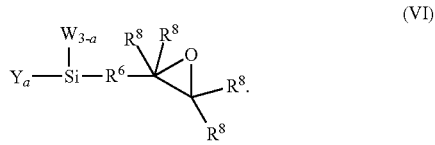

With respect to chemical structure (VI), a is a number from 1 to 3, $R^6$ is an alkylene group that is interrupted by an oxygen atom (such as for example —$CH_2$—O—$C_3H_6$—), each $R^8$ is independently a hydrogen or alkyl group such as for example a $C_1$ to $C_6$ alkyl group, W is a $C_1$ to $C_4$ alkyl group, and Y is a hydrolyzable group. In some non-limiting examples, a is 3, $R^6$ is a $C_2$ to $C_4$ alkylene group that is interrupted by an oxygen atom, each $R^8$ is a hydrogen, and Y is an alkoxy group such as a $C_1$-$C_4$ alkoxy group, for example a methoxy group.

A commercially available hydrolyzable silane comprising an epoxy group includes 3-glycidoxypropyltrimethoxysilane, which is also sold by Momentive Performance Materials under the tradename SILQUEST® A-187™.

The carboxylic acid functional fluoropolyether and the epoxy functional hydrolyzable silane can also be reacted under heat such as at a temperature within a range from 100° C. to 130° C. For example, the hydroxyl functional fluoropolyether can be reacted with the epoxy functional hydrolyzable silane at a temperature of 120° C. until an acid value of less than 2 was obtained with a Metrohm 888 Titrando using a 0.1 N KOH solution in methanol as the reagent.

The resulting reaction product formed from the previously described carboxylic acid functional fluoropolyether and epoxy functional hydrolyzable silane is a fluoropolyether comprising a hydroxyl group and a hydrolyzable silyl group. The resulting fluoropolyether also comprises ester and ether linkages.

The method further comprises reacting the fluoropolyether comprising the hydroxyl group and hydrolyzable silyl group with: (a) a hydrolyzable silane comprising an isocyanate group; (b) a fluorinated compound comprising a chlorine, bromine, or iodine bonded to a silicon atom; or (c) an anhydride compound comprising $CF_3$ groups, $CF_2H$ groups, or combinations thereof.

The (a) hydrolyzable silane comprising the isocyanate group can comprise any of the previously described hydrolyzable groups attached to a silicon atom such as an alkoxy group (e.g. a $C_1$-$C_4$ alkoxy group, such as a methoxy group), for example, to thereby form an alkoxysilane. A non-limiting example of a suitable hydrolyzable silane comprising the epoxy group is represented by chemical structure (VII):

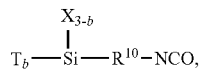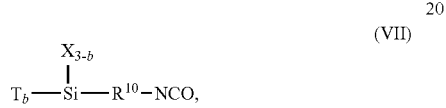

(VII)

With respect to chemical structure (VII), b is a number from 1 to 3, $R^{10}$ is an alkylene group, X is a $C_1$ to $C_4$ alkyl group, and T is a hydrolyzable group. In some non-limiting examples, a is 3, $R^2$ is a $C_2$ to $C_4$ alkylene group, and T is an alkoxy group such as a $C_1$-$C_4$ alkoxy group, for example a methoxy group.

A commercially available hydrolyzable silane comprising an isocyanate group is 3-isocyanatopropyltrimethoxysilane, which is sold by Momentive Performance Materials under the tradename SILQUEST® A-link 35.

The fluoropolyether comprising the hydroxyl group and hydrolyzable silyl group can be reacted with the hydrolyzable silane comprising the isocyanate group under heat such as at a temperature within a range from 60° C. to 80° C. For example, the reaction can take place at a temperature of 70° C. until IR spectroscopy showed the absence of the characteristic NCO band (2269 cm-1) using a ThermoScientific Nicolet iS5 FT-IR.

The resulting fluoropolymer according to the present invention includes ester linkages, fluoropolyether linkages, and hydrolyzable functional groups. The resulting fluoropolymer also includes ether linkages as well as at least one urethane linkage. It is appreciated that the hydrolyzable functional groups comprise hydrolyzable silyl groups that are formed from the hydrolyzable silane comprising the epoxy group and the hydrolyzable silane comprising the isocyanate group. For instance, the resulting fluoropolymer can comprise two different alkoxysilyl groups formed from an alkoxysilane comprising the epoxy group and an alkoxysilane comprising the isocyanate group.

A non-limiting example of the resulting fluoropolymer is represented by chemical structure (I) in which each $R^1$ is independently fluorine, $R^2$ is an alkylene group, $R^3$ is an alkylene group completely free of fluorine atoms, $R^4$ is an alkyl group in which all the hydrogens of the alkyl group are substituted with fluorine, $R^5$ is an alkylene group in which one hydrogen is substituted with a group represented by chemical structure (V), and Z is a group represented by chemical structure (II),

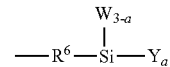

in which a is 3, $R^6$ is an alkylene group that is interrupted by an oxygen atom, and each Y is an alkoxy group. A non-limiting example of such a fluoropolymer is represented by the following chemical structure:

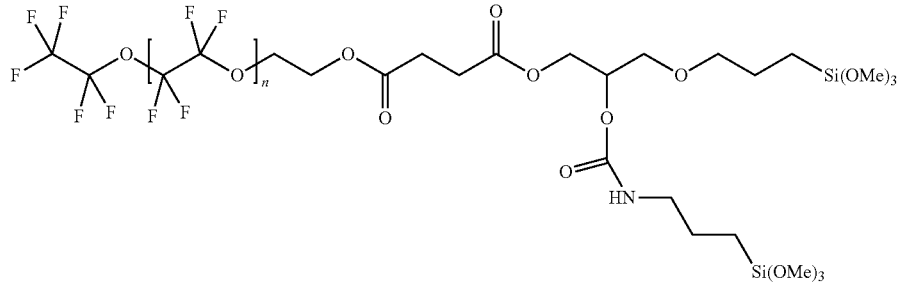

As previously described, the fluoropolyether comprising the hydroxyl group and hydrolyzable silyl group can also be reacted with (b) a fluorinated compound comprising a chlorine, bromine, or iodine bonded to a silicon atom. A non-limiting example of a fluorinated compound comprising a chlorine, bromine, or iodine bonded to a silicon atom is represented by chemical structure (VIII):

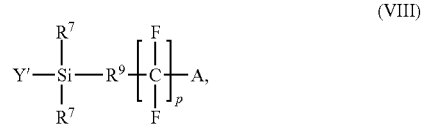

(VIII)

With respect to chemical structure (VIII), p is a is a number from 1 to 8 such as from 1 to 6 or 1 to 5 or 1 to 4, $R^9$ is an alkylene group, each $R^7$ is independently an alkyl group, Y' is chlorine, bromine, or iodine, and A is $CF_3$ or $CF_2H$. In some non-limiting examples, p is a number from 1 to 4, $R^9$ is a $C_2$ to $C_4$ alkylene group, each $R^7$ is independently a $C_1$ to $C_4$ alkyl group, Y' is chlorine, and A is $CF_3$. Specific non-limiting examples of suitable fluorinated compounds comprising a chlorine, bromine, or iodine bonded to a silicon atom are (Tridecafluoro-1,1,2,2,-tetrehydrooctyl) dimethylchlorosilane and (nonafluoro-1,1,2,2,-tetrehydrohexyl) dimethylchlorosilane.

The fluoropolyether comprising the hydroxyl group and hydrolyzable silyl group can be reacted with the fluorinated compound comprising a chlorine, bromine, or iodine bonded to a silicon atom under heat such as at a temperature within a range from 20° C. to 100° C., or from 30° C. to 90° C., or from 40° C. to 80° C. For example, the reaction can take place at a temperature of 70° C.

The resulting fluoropolymer according to the present invention includes ester linkages, fluoropolyether linkages, and hydrolyzable functional groups. The resulting fluoropolymer also includes ether linkages and a pendant group comprising fluorine atoms provided by the fluorinated compound of (b). It is appreciated that the hydrolyzable functional groups comprise hydrolyzable silyl groups that are formed from the hydrolyzable silane comprising the epoxy group. For instance, the resulting fluoropolymer can comprise an alkoxysilyl group formed from an alkoxysilane comprising the epoxy group.

A non-limiting example of the resulting fluoropolymer is represented by chemical structure (I) in which each $R^1$ is independently fluorine, $R^2$ is an alkylene group, $R^3$ is an alkylene group completely free of fluorine atoms, $R^4$ is an alkyl group in which all the hydrogens of the alkyl group are substituted with fluorine, $R^5$ is an alkylene group in which one hydrogen is substituted with a group represented by chemical structure (III), and Z is a group represented by chemical structure (II),

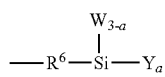

in which a is 3, $R^6$ is an alkylene group that is interrupted by an oxygen atom, and each Y is an alkoxy group. A non-limiting example of such a fluoropolymer is represented by the following chemical structure:

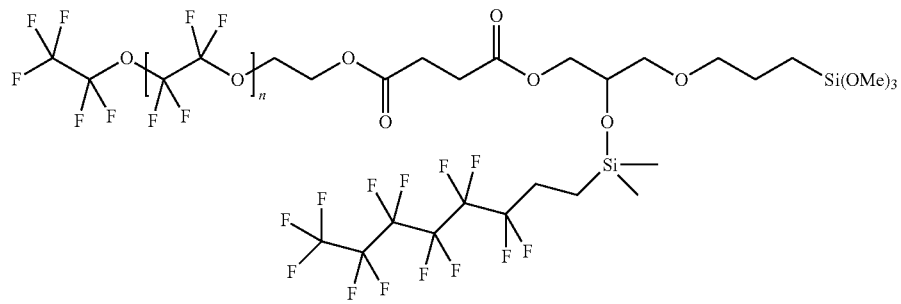

As indicated, the fluoropolyether comprising the hydroxyl group and hydrolyzable silyl group can also be reacted with (c) an anhydride compound comprising $CF_3$ groups, $CF_2H$ groups, or combinations thereof. The anhydride can be formed from cyclic, linear, or branched dicarboxylic acid that have $CF_3$ groups, $CF_2H$ groups, or combinations thereof. A non-limiting example of an anhydride compound comprising $CF_3$ groups, $CF_2H$ groups, or combinations thereof is represented by chemical structure (IX):

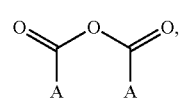

With respect to chemical structure (IX), each A is independently $CF_3$ or $CF_2H$. In some non-limiting examples, each A is $CF_3$ thereby forming trifluoroacetic anhydride.

The fluoropolyether comprising the hydroxyl group and hydrolyzable silyl group can be reacted with the anhydride compound comprising $CF_3$ groups, $CF_2H$ groups, or combinations thereof under heat such as at a temperature within a range from 60° C. to 80° C. For example, the reaction can take place at a temperature of 70° C. until IR spectroscopy showed the absence of the characteristic anhydride band (1785 cm-1) using a ThermoScientific Nicolet iS5 FT-IR.

The resulting fluoropolymer according to the present invention includes ester linkages, fluoropolyether linkages, and hydrolyzable functional groups. The resulting fluoropolymer also includes ether linkages and a pendant group comprising $CF_3$ groups and/or $CF_2H$ groups provided by the anhydride compound of (c). It is appreciated that the hydrolyzable functional groups comprise hydrolyzable silyl groups that are formed from the hydrolyzable silane comprising the epoxy group. For instance, the resulting fluoropolymer can comprise an alkoxysilyl group formed from an alkoxysilane comprising the epoxy group.

A non-limiting example of the resulting fluoropolymer is represented by chemical structure (I) in which each $R^1$ is independently fluorine, $R^2$ is an alkylene group, $R^3$ is an alkylene group completely free of fluorine atoms, $R^4$ is an alkyl group in which all the hydrogen of the alkyl group are substituted with fluorine, $R^5$ is an alkylene group in which one hydrogen is substituted with a group represented by chemical structure (IV), and Z is a group represented by chemical structure (II),

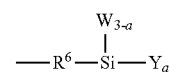

in which a is 3, $R^6$ is an alkylene group that is interrupted by an oxygen atom, and each Y is an alkoxy group. A non-limiting example of such a fluoropolymer is represented by the following chemical structure:

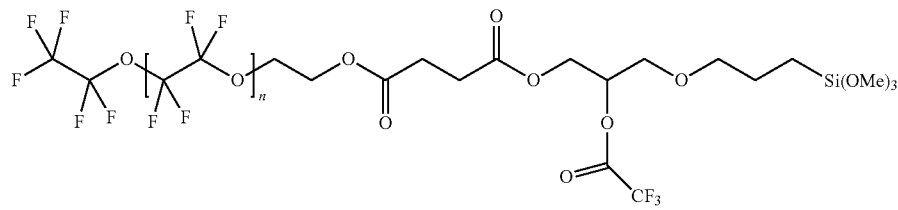

The previously described reactants can, optionally, be mixed and reacted in a non-aqueous solvent. As used herein, the term "non-aqueous" refers to a liquid medium comprising less than 50 weight % water, based on the total weight of the liquid medium. In accordance with the present invention, such non-aqueous liquid mediums can comprise less than 40 weight % water, or less than 30 weight % water, or less than 20 weight % water, or less than 10 weight % water, or less than 5 weight % water, based on the total weight of the liquid medium. The solvents that make up at least or more than 50 weight % and optionally up to 100 weight % of the liquid medium include organic solvents. Non-limiting examples of suitable organic solvents include polar organic solvents, e.g. protic organic solvents such as glycols, glycol ether alcohols, alcohols; and aprotic organic solvents such as ketones, glycol diethers, esters, and diesters. Other non-limiting examples of organic solvents include non-polar solvents such as aromatic and aliphatic hydrocarbons.

In addition, the previously described reactants can, optionally, be reacted in the presence of a catalyst. Non-limiting examples of suitable catalysts include metal and salt catalysts.

The present invention is further directed to a coating composition that comprises the previously described fluoropolymer. The coating composition can comprise one type of fluoropolymer according to the present invention. Alternatively, the coating composition can comprise a mixture of different types of the previously described fluoropolymers according to the present invention.

The fluoropolymer(s) of the present invention can comprise at least 0.01 weight %, at least 0.05 weight %, at least 0.1 weight %, or at least 1 weight %, based on the total weight of the coating composition. The fluoropolymer(s) can also comprise up to 8 weight %, up to 5 weight %, or up to 2 weight %, based on the total weight of the coating composition. The fluoropolymer(s) can also comprise a weight % within a range from 0.01 to 8 weight %, from 0.05 to 5 weight %, from 0.1 to 5 weight %, or from 1 to 2 weight %, based on the total weight of the coating composition.

The coating composition can also comprise a non-aqueous solvent. The non-aqueous solvent can comprise any of the non-aqueous solvents previously described. The non-aqueous solvent can also comprise a fluorinated solvent. For example, the non-aqueous solvent can comprise hydrofluorocarbons including, but not limited to, methoxy-nonafluorobutane ($C_4F_9OCH_3$) solvent, ethoxy-nonafluorobutane ($C_4F_9OC_2H_5$) solvent, and combinations thereof.

The non-aqueous solvent, such as a non-aqueous solvent comprising a fluorinated solvent, can comprise at least 80 weight %, at least 85 weight %, at least 90 weight %, at least 95 weight %, or at least 98 weight %, based on the total weight of the coating composition.

The coating composition can also include an acid catalyst. The acid catalyst can include, but is not limited to, carboxylic acids, hydrogen halides, sulfuric acid, nitric acid, or combinations thereof. Non-limiting examples of suitable carboxylic acids include formic acid, acetic acid, propionic acid, butyric acid, capric acid, benzoic acid, and combinations thereof. Further, non-limiting examples of hydrogen halides include, but are not limited to, hydrogen fluoride, hydrogen chloride, hydrogen bromide, and combinations thereof.

The coating composition of the present invention can also include other optional materials. For example, the coating composition can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures or combinations thereof. The terms "pigment" and "colored filler" can be used interchangeably.

Example dyes include, but are not limited to, those that are solvent and/or aqueous based such as phthalo green or blue, iron oxide, bismuth vanadate, and mixtures or combinations thereof.

Example tints include, but are not limited to, pigments dispersed in water-based or water-miscible carriers such as AQUA-CHEM 896 commercially available from Degussa, Inc., CHARISMA COLORANTS, and MAXITONER INDUSTRIAL COLORANTS commercially available from Accurate Dispersions Division of Eastman Chemical, Inc.

Other non-limiting examples of materials that can be used with the coating compositions of the present invention include plasticizers, abrasion resistant particles, fillers including, but not limited to, micas, talc, clays, and inorganic minerals, anti-oxidants, surfactants, flow and surface control agents, thixotropic agents, reactive diluents, reaction inhibitors, and other customary auxiliaries.

It is appreciated that the coating composition of the present invention can be free of additional resins and/or crosslinkers other than those previously described. Alternatively, the coating composition of the present invention can include additional resins and/or crosslinkers. The additional resins can include any of a variety of thermoplastic and/or thermosetting resins known in the art. As used herein, the term "thermosetting" refers to resins that "set" irreversibly upon curing or crosslinking, wherein the polymer chains are joined together by covalent bonds. This property is usually associated with a cross-linking reaction often induced, for example, by heat or radiation. Curing or crosslinking reactions also may be carried out under ambient conditions. Once cured, a thermosetting resin will not melt upon the application of heat and is insoluble in solvents. As noted, the additional resins can also include a thermoplastic resin. As used herein, the term "thermoplastic" refers to resins that include polymeric components that are not joined by covalent bonds and, thereby, can undergo liquid flow upon heating and are soluble in solvents.

The additional resins can be selected from, for example, polyurethanes, acrylic polymers, polyester polymers, polyamide polymers, polyether polymers, polysiloxane polymers, epoxy resins, vinyl resins, copolymers thereof, and mixtures thereof. Thermosetting resins typically comprise reactive functional groups. The reactive functional groups can include, but are not limited to, carboxylic acid groups, amine groups, epoxide groups, hydroxyl groups, thiol groups, carbamate groups, amide groups, urea groups, isocyanate groups (including blocked isocyanate groups), and combinations thereof.

Coating compositions containing thermosetting resins typically comprise a crosslinker known in the art to react with the functionality on the thermosetting resins. As used herein, the term "crosslinker" refers to a molecule comprising two or more functional groups that are reactive with other functional groups and which is capable of linking two or more monomers or polymer molecules through chemical bonds. The thermosetting resins can also have functional groups that are reactive with themselves; in this manner, such resins are self-crosslinking.

The coating compositions of the present invention can be prepared by forming a fluoropolymer as previously described, and then mixing the fluoropolymer in the non-aqueous solvent. Optionally, any of the other previously described components, can be mixed with the fluoropolymer. The coating composition can then be applied at least partially over a substrate. The coating composition of the present invention can be applied to a wide range of substrates known in the coatings industry.

Non-limiting examples of suitable substrates include automotive substrates, industrial substrates, packaging substrates, aerocraft and aerocraft components, marine substrates and components such as ships, vessels, and on-shore and off-shore installations, wood flooring and furniture, apparel, electronics, including housings and circuit boards, glass and transparencies, sports equipment, including golf balls, and the like. These substrates can be, for example, metallic or non-metallic. Further, the substrates coated with the coating compositions of the present invention typically have at least one flat surface, and often have two opposing surfaces. Either one or both surfaces may be coated with the coatings of the present invention.

Non-metallic substrates include polymeric, plastic, polyolefin, cellulosic, polystyrene, polyacrylic, poly(ethylene naphthalate), nylon, EVOH, polylactic acid, polycarbonate, blends of polycarbonate and acrylonitrile butadiene styrene copolymer (PC/ABS), wood, veneer, wood composite, particle board, medium density fiberboard, cement, stone, sapphire, glass, paper, cardboard, textiles, leather, both synthetic and natural, and the like.

Specific non-limiting examples of suitable plastic substrates include substrates prepared from polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea urethane) polymers, which are prepared, for example, by the reaction of a polyurethane prepolymer and a diamine curing agent, a composition for one such polymer being sold under the trademark TRIVEX® by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; polyamide; triacetate (TAC); cyclo olefin polymer (COP); poly (ethoxylated Bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from Bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and, optionally, ethylenically unsaturated monomers or halogenated aromatic-containing vinyl monomers. Copolymers of such monomers and blends of the described polymers and copolymers with other polymers can also be used, e.g., to form interpenetrating network products.

Examples of metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. The metallic substrates can also include highly polished stainless steel substrates.

Non-limiting examples of glass substrates include soda-lime-silica glass such as conventional untinted soda-lime-silica glass, i.e., "clear glass", or tinted or otherwise colored glass, borosilicate glass, aluminosilicate glass such as GORILLA® glass (commercially available from Corning, Inc.) or Dragontrail® glass (commercially available from Asahi Glass Co., Ltd), leaded glass, tempered, untempered, annealed, or heat-strengthened glass. The glass may be of any type, such as conventional float glass or flat glass, and may be of any composition having any optical properties such as a transparent glass substrate.

The coating composition of the present invention is particularly useful when applied to glass substrates, plastic substrates, and combinations thereof that are found on consumer electronic products. The substrates can be transparent and have at least one flat surface. For example, the coating compositions of the present invention can be applied to glass and/or plastic substrates found on laptops, tablets, cellular phones, other handheld electronic devices, and the like that can be controlled by a person's fingers. As such, the glass and/or plastic substrates of such devices can comprise a touch screen or display.

The coating compositions of the present invention can be applied by various means known in the art including, but not limited to, spraying, spin coating, dip coating, or a combination thereof. After the coating compositions are applied to a substrate, the compositions can be dried or cured at ambient conditions, with heat, or with other means such as actinic radiation to form a coating. In some examples, the coating compositions of the present invention are heated at temperature within a range of 50° C. to 150° C., or from 75° C. to 125° C., or from 90° C. to 110° C., to form a coating over the surface of the substrate.

As used herein, the term "ambient conditions" refers to the conditions of the surrounding environment (e.g., the temperature, humidity, and pressure of the room or outdoor environment in which the substrate is located). The term "actinic radiation" refers to electromagnetic radiation that can initiate chemical reactions. Actinic radiation includes, but is not limited to, visible light, ultraviolet (UV) light, X-ray, and gamma radiation.

The coatings of the present invention can be applied and cured to a dry film thickness of from 5 nm to 20 nm, or from 8 nm to 12 nm, or 10 nm.

It is appreciated that the coating compositions of the present invention can be applied directly onto the surface of a substrate to form a coating layer directly over the surface of the substrate. Alternatively, the coating compositions of the present invention can be applied over a first coating layer such as a first coating layer formed on the surface of an electronic device comprising a touch screen or display. As such, the coating compositions of the present invention can be applied over a first coating layer and cured to form a second top coating layer.

The coatings deposited from the coating compositions described herein have been found to exhibit good easy clean properties. That is, marks and smudges that are present on the coatings of the present invention can be easily removed. The coatings, therefore, exhibit high initial water contact angles. For example, the coatings of the present invention have been found to exhibit initial water contact angles of at least 80°, at least 900, or at least 1000. The coatings can also exhibit a water contact of up to 1300, up to 1200, or up to 1150. The coatings can also exhibit a water contact angle range such as from 80° to 1300, 90° to 1200, or 100° to 1150. The water contact angles are determined by a VCA optima contact angle measurement system available from AST Products, Inc. following the instruction manual of the VCA optima contact angle measurement system. The coatings deposited from the coating compositions described herein also exhibit other properties desired in a coating including, but not limited to, good adhesion and durability.

The following examples are presented to demonstrate the general principles of the invention. The invention should not be considered as limited to the specific examples presented. All parts and percentages in the examples are by weight unless otherwise indicated.

Example 1

Preparation of a Fluoropolymer

An alkoxysilyl functional fluoropolyether fluoropolymer was prepared from the components listed in Table 1.

TABLE 1

| Component | Parts by weight |
|---|---|
| Charge A | |
| FOMBLIN ® ZNF 402 [1] | 29.5 |
| Succinic anhydride | 0.801 |
| Charge B | |
| SILQUEST ® A-187 ™ [2] | 1.889 |
| Ethyltriphenylphosphonium iodide | 0.01 |

TABLE 1-continued

| Component | Parts by weight |
|---|---|
| Charge C | |
| Novec ™ 7200 [3] | 265.11 |
| Charge D | |
| SILQUEST ® A-link 35 [4] | 1.64 |
| Charge E | |
| Novec ™ 7200 [3] | 3.28 |
| Charge F | |
| Novec ™ 7200 [3] | 328.45 |

[1] A monohydroxy derivative of perfluoropolyoxyalkane, commercially available from Solvay.
[2] 3-Glycidoxypropyltrimethoxysilane, commercially available from Momentive Performance Materials.
[3] A mixture of ethyl nonafluorobutyl ether and ethyl nonafluoroisobutyl ether, commercially available from 3M.
[4] 3-isocyanatopropyltrimethoxysilane, commercially available from Momentive Performance Materials.

Charge A was added to a 500 mL, 4-necked flask equipped with a motor driven stainless steel stir blade, a water-cooled condenser, a nitrogen blanket, and a heating mantle with a thermometer connected through a temperature feedback control device. The reaction mixture was heated to 120° C. and held at 120° C. until IR spectroscopy showed the absence of the characteristic anhydride band (1785 cm-1) using a ThermoScientific Nicolet iS5 FT-IR. Then charge B was added at 120° C. and held until an acid value of less than 2 was obtained with a Metrohm 888 Titrando using a 0.1 N KOH solution in methanol as the reagent. The reaction mixture was cooled to 70° C. by addition of charge C into the flask. At 70° C., charge D was added into the flask over 5 minutes followed by a rinse with charge E. The reaction mixture was held at 70° C. until IR spectroscopy showed the absence of the characteristic NCO band (2269 cm-1) using the ThermoScientific Nicolet iS5 FT-IR. The reaction product was cooled to room temperature and filtered through a filter paper. The reaction mixture was further diluted with charge F.

Example 2

Preparation of a Fluoropolymer

An alkoxysilyl functional fluoropolyether fluoropolymer was prepared from the components listed in Table 2.

TABLE 2

| Component | Parts by weight |
|---|---|
| Charge A | |
| FOMBLIN ® ZNF 402 [1] | 14.3 |
| Succinic anhydride | 0.40 |
| Methyl ethyl ketone | 5.0 |
| Charge B | |
| SILQUEST ® A-187 ™ [2] | 0.944 |
| Ethyltriphenylphosphonium iodide | 0.005 |
| Charge C | |
| Novec ™ 7200 [3] | 128.5 |
| Charge D | |
| Triethylamine | 0.40 |
| Charge E | |
| (Tridecafluoro-1,1,2,2,-tetrehydrooctyl)dimethylchlorosilane | 1.76 |

TABLE 2-continued

| Component | Parts by weight |
|---|---|
| Charge F | |
| Novec ™ 7200 [3] | 3.52 |
| Charge G | |
| Novec ™ 7200 [3] | 211.20 |

Charge A was added to a 500 mL, 4-necked flask equipped with a motor driven stainless steel stir blade, a water-cooled condenser, a nitrogen blanket, and a heating mantle with a thermometer connected through a temperature feedback control device. The reaction mixture was heated to 120° C. and held at 120° C. until IR spectroscopy showed the absence of the characteristic anhydride band (1785 cm-1) using a ThermoScientific Nicolet iS5 FT-IR. Then charge B was added at 120° C. and held until an acid value of less than 2 was obtained with a Metrohm 888 Titrando using a 0.1 N KOH solution in methanol as the reagent. The reaction mixture was cooled to 70° C. by addition of charge C into the flask. At 70° C., charge D was added into the flask over 5 minutes. Charge E was then added into the reaction mixture over 5 minutes followed by a rinse with charge F. The reaction mixture was held at 70° C. for 1 hour. Charge G was next added to the reaction mixture. The reaction product was cooled to room temperature and filtered through a filter paper.

Example 3

Preparation of a Fluoropolymer

An alkoxysilyl functional fluoropolyether fluoropolymer was prepared from the components listed in Table 3.

TABLE 3

| Component | Parts by weight |
|---|---|
| Charge A | |
| FOMBLIN ® ZNF 402 [1] | 14.3 |
| Succinic anhydride | 0.40 |
| Methyl ethyl ketone | 5.0 |
| Charge B | |
| SILQUEST ® A-187 ™ [2] | 0.944 |
| Ethyltriphenylphosphonium iodide | 0.006 |
| Charge C | |
| Novec ™ 7200 [3] | 128.5 |
| Charge D | |
| Trifluoroacetic anhydride | 0.84 |
| Charge E | |
| Novec ™ 7200 [3] | 1.68 |
| Charge F | |
| Novec ™ 7200 [3] | 176.43 |

Charge A was added to a 500 mL, 4-necked flask equipped with a motor driven stainless steel stir blade, a water-cooled condenser, a nitrogen blanket, and a heating mantle with a thermometer connected through a temperature feedback control device. The reaction mixture was heated to 120° C. and held at 120° C. until IR spectroscopy showed the absence of the characteristic anhydride band (1785 cm-1) using a ThermoScientific Nicolet iS5 FT-IR. Then charge B was added at 120° C. and held until an acid value of less than 2 was obtained with a Metrohm 888 Titrando using a 0.1 N KOH solution in methanol as the reagent. The reaction mixture was cooled to 70° C. by addition of charge C into the flask. At 70° C., charge D was added into the flask over 5 minutes followed by a rinse with charge E. The reaction mixture was held at 70° C. until IR spectroscopy showed the absence of the characteristic anhydride band (1785 cm-1) using the ThermoScientific Nicolet iS5 FT-IR. Charge F was then added into the reaction mixture. The reaction product was cooled to room temperature and filtered through a filter paper. A clear solution was obtained.

Examples 4-6

Preparation of Coating Compositions

Three different coating compositions were prepared with the alkoxysilyl functional fluoropolyether fluoropolymers of Examples 1-3 as shown in Table 4.

TABLE 4

| Example | Fluoropolymer (%) | Solvent (%) |
|---|---|---|
| 4 | 1.5% of the polymer of Example 1 | 98.5% of Novec ™ HFE 7100 [5] |
| 5 | 1.5% of the polmyer of Example 2 | 98.5% of Novec ™ HFE 7200 [6] |
| 6 | 1.5% of the polymer of Example 3 | 98.5% of Novec ™ HFE 7200 [6] |

[5] Methoxy-nonafluorobutane ($C_4F_9OCH_3$) solvent, commercially available from 3M.
[6] Ethoxy-nonafluorobutane ($C_4F_9OC_2H_5$) solvent, commercially available from 3M.

The fluoropolymers and solvents listed in Table 4 of each of Examples 4-6 were independently weighed and mixed on a shaker for 30 minutes.

Examples 7-12

Application and Evaluation of Coatings

Soda lime glass substrates were first cleaned and then pre-treated with a plasma treatment using an ATTO plasma treater (available from Diener Electronics, Germany) in a nitrogen atmosphere. Various coatings containing the compositions of Examples 4-6 were then independently applied over the substrates with a Prism Ultra-Coat ultrasonic spray coater available from Ultrasonic Systems, Inc., at a flow rate of 23 ml/min and a speed of 400 mm/min. The coating compositions were cured at 100° C. for 10 minutes to form coatings over each of the substrates.

The water contact angles of the cured coatings were tested using a VCA optima contact angle measurement system available from AST Products, Inc.

TABLE 5

| Example | Composition used to form the coating | Water Contact Angle (°) |
|---|---|---|
| 7 | Example 4 | 114.9 |
| 8 | Example 4 | 114.6 |
| 9 | Example 5 | 113.7 |
| 10 | Example 5 | 114.6 |
| 11 | Example 6 | 111.2 |
| 12 | Example 6 | 110.7 |

The present invention is also directed to the following clauses.

Clause 1: A fluoropolymer comprising fluoropolyether linkages, at least two ester linkages, and at least one hydrolyzable functional group, wherein the fluoropolymer is represented by chemical structure (I):

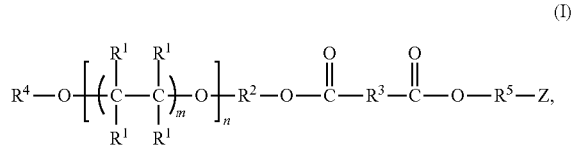

wherein m is a number from 1 to 4 and n is a number from 10 to 60,
each $R^1$ is independently fluorine or $CF_3$,
$R^2$ is an alkylene group,
$R^3$ is an alkylene group in which one or more hydrogens of the alkylene group are optionally substituted with fluorine,
$R^4$ is an alkyl group in which one or more hydrogens of the alkyl group are substituted with fluorine,
$R^5$ is an alkylene group in which at least one hydrogen, such as one hydrogen, of the alkylene group is substituted with a group comprising $CF_3$, $CF_2H$, or a hydrolyzable silyl group, and
Z is a group represented by chemical structure (II),

wherein a is a number from 1 to 3,
$R^6$ is an alkylene group that is interrupted by an oxygen atom,
W is a $C_1$ to $C_4$ alkyl group, and
Y is a hydrolyzable group.

Clause 2: The fluoropolymer of clause 1, wherein the alkylene group of $R^2$ and $R^3$ is independently selected from a linear or branched $C_1$-$C_{30}$ divalent hydrocarbon radical or a cyclic $C_3$-$C_{19}$ divalent hydrocarbon radical, typically a linear or branched $C_1$-$C_{20}$ divalent hydrocarbon radical, or a linear or branched $C_1$-$C_{10}$ divalent hydrocarbon radical, or a linear or branched $C_1$ to $C_6$ divalent hydrocarbon radical, or a linear or branched $C_2$ to $C_4$ divalent hydrocarbon radical.

Clause 3: The fluoropolymer of clauses 1 or 2, wherein the alkyl group of $R^4$ is a linear or branched $C_1$-$C_{30}$ monovalent hydrocarbon radical or a cyclic $C_3$-$C_{19}$ monovalent hydrocarbon radical, typically a linear or branched $C_1$-$C_{20}$ monovalent hydrocarbon radical, or a linear or branched $C_1$-$C_{10}$ monovalent hydrocarbon radical, or a linear or branched $C_1$ to $C_6$ monovalent hydrocarbon radical, or a linear or branched $C_2$ to $C_4$ divalent hydrocarbon radical.

Clause 4: The fluoropolymer of any of clauses 1 to 3, wherein the alkylene group of $R^5$ is a substituted linear or branched $C_1$-$C_{30}$ divalent hydrocarbon radical or a substituted cyclic $C_3$-$C_{19}$ divalent hydrocarbon radical, typically a substituted linear or branched $C_1$-$C_{20}$ divalent hydrocarbon radical, or a substituted linear or branched $C_1$-$C_{10}$ divalent hydrocarbon radical, or a substituted linear or branched $C_1$ to $C_6$ divalent hydrocarbon radical, or a substituted linear or branched $C_2$ to $C_4$ divalent hydrocarbon radical.

Clause 5: The fluoropolymer of any of clauses 1 to 4, wherein the alkylene group of $R^6$ is a linear or branched $C_1$-$C_{30}$ divalent hydrocarbon radical or a cyclic $C_3$-$C_{19}$ divalent hydrocarbon radical, typically a linear or branched $C_1$-$C_{20}$ divalent hydrocarbon radical, or a linear or branched $C_1$-$C_{10}$ divalent hydrocarbon radical, or a linear or branched $C_1$ to $C_6$ divalent hydrocarbon radical, or a linear or branched $C_2$ to $C_4$ divalent hydrocarbon radical, each interrupted by an oxygen atom.

Clause 6: The fluoropolymer of any of clauses 1 to 5, wherein the hydrolysable group Y is independently selected from a halide, an alkoxy group, such as a $C_1$-$C_6$ or $C_1$-$C_4$ alkoxy group, or a polyoxyalkylene group, typically a $C_1$-$C_4$ alkoxy group, such as a methoxy group.

Clause 7: The fluoropolymer of any of clauses 1 to 6, wherein the hydrolysable silyl group comprises a silicon atom bonded to at least one hydrolyzable group as defined for Y in structure (II).

Clause 8: The fluoropolymer of any one of clauses 1 to 7, wherein the alkylene group of $R^3$ is completely free of fluorine.

Clause 9: The fluoropolymer of any one of clauses 1 to 8, wherein all the hydrogens of the alkylene group of $R^3$ are substituted with fluorine.

Clause 10: The fluoropolymer of any one of clauses 1 to 9, wherein all the hydrogens of the alkyl group of $R^4$ are substituted with fluorine.

Clause 11: The fluoropolymer of any of clauses 1 to 10, wherein the at least one hydrogen of the alkylene group of $R^5$ is substituted with a group represented by chemical structure (III):

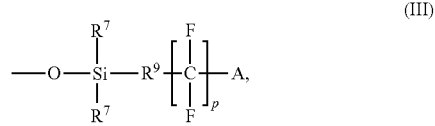

wherein p is a number from 1 to 8,
$R^9$ is an alkylene group as defined for $R^2$ in structure (I),
each $R^7$ is independently an alkyl group as defined for $R^4$ in structure (I), and
A is $CF_3$ or $CF_2H$.

Clause 12: The fluoropolymer of any of clauses 1 to 11, wherein the at least one hydrogen of the alkylene group of $R^5$ is substituted with a group represented by chemical structure (IV):

wherein B is $CF_3$ or $CF_2H$.

Clause 13: The fluoropolymer of any of clauses 1 to 12, wherein the at least one hydrogen of the alkylene group of $R^5$ is substituted with a group represented by chemical structure (V):

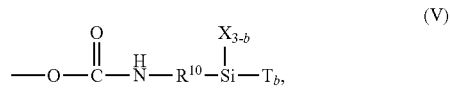

wherein b is a number from 1 to 3,
$R^{10}$ is an alkylene group as defined for $R^2$ in structure (I),
X is a $C_1$ to $C_4$ alkyl group, and
T is a hydrolyzable group as defined for Y in structure (II).

Clause 14: The fluoropolymer of any of clauses 1 to 13, wherein, in chemical structure (II), a is 3 and Y is an alkoxy group, such as a $C_1$ to $C_4$ alkoxy group, for example a methoxy group.

Clause 15: The fluoropolymer of any of clauses 1 to 14, wherein the fluoropolymer is completely free of siloxane units.

Clause 16: The fluoropolymer of any of clauses 1 to 15, wherein, in chemical structure (I) $R^1$ is fluorine.

Clause 17: The fluoropolymer of any of clauses 1 to 16, wherein, in chemical structure (I) m is 1.

Clause 18: The fluoropolymer of any of clauses 1 to 17, wherein, in chemical structure (I) $R^2$ is ethylene.

Clause 19: The fluoropolymer of any of clauses 1 to 18, wherein, in chemical structure (I) $R^3$ is ethylene.

Clause 20: The fluoropolymer of any of clauses 1 to 18, wherein, in chemical structure (I) $R^3$ is an alkylene group in which all the hydrogens of the alkylene group are substituted with fluorine, such as a perfluoropropylene group.

Clause 21: The fluoropolymer of any of clauses 1 to 20, wherein, in chemical structure (I) $R^4$ is an alkyl group in which all the hydrogens of the alkyl group are substituted with fluorine such, as a perfluoroethyl group.

Clause 22: The fluoropolymer of any of clauses 1 to 21, wherein, in chemical structure (I) $R^5$ is an ethylene group in which one hydrogen atom is substituted with a group comprising $CF_3$, $CF_2H$, or a hydrolysable silyl group.

Clause 23: The fluoropolymer of any of clauses 1 to 22, wherein, in chemical structure (II) $R^6$ is —$CH_2$—O—$C_3H_6$—.

Clause 24: A method of preparing a fluoropolymer according to any of clauses 1 to 23 comprising: (i) reacting a fluoropolyether comprising a hydroxyl group with a dicarboxylic acid anhydride to produce a fluoropolyether comprising a carboxylic acid group; (ii) reacting the fluoropolyether comprising the carboxylic acid group with a hydrolyzable silane comprising an epoxy group to produce a fluoropolyether comprising a hydroxyl group and a hydrolyzable silyl group; and (iii) reacting the fluoropolyether comprising the hydroxyl group and the hydrolyzable silyl group with: (a) a hydrolyzable silane comprising an isocyanate group; (b) a fluorinated compound comprising a chlorine, bromine, or iodine bonded to a silicon atom; or (c) an anhydride compound comprising $CF_3$ groups, $CF_2H$ groups, or combinations thereof.

Clause 25: The method of clause 24, wherein the anhydride compound in step (i) is a cyclic anhydride compound.

Clause 26: The method of clause 25, wherein the anhydride compound in step (i) is succinic anhydride.

Clause 27: The method of clause 25, wherein the cyclic anhydride compound comprises pendant fluorine atoms such as tetrafluorosuccinic anhydride or hexafluoroglutaric anhydride.

Clause 28: The method of any of clauses 24 to 27, wherein the hydrolyzable silane comprising the epoxy group in step (ii) is represented by chemical structure (VI):

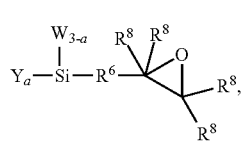

(VI)

wherein a is a number from 1 to 3,
$R^6$ is an alkylene group that is interrupted by an oxygen atom as defined in structure (II),
each $R^8$ is independently a hydrogen or alkyl group,
W is a $C_1$ to $C_4$ alkyl group, and
Y is a hydrolyzable group.

Clause 29: The method of any of clauses 24 to 28, wherein the fluoropolyether comprising the hydroxyl group and the hydrolyzable silyl group in step (iii) is reacted with (a) the hydrolyzable silane comprising the isocyanate group.

Clause 30: The method of clause 29, wherein (a) the hydrolyzable silane comprising the isocyanate group is represented by chemical structure (VII):

(VII)

wherein b is a number from 1 to 3,
$R^{10}$ is an alkylene group as defined for $R^2$ in structure (I),
X is a $C_1$ to $C_4$ alkyl group, and
T is a hydrolyzable group as defined for Y in structure (II).

Clause 31: The method of any of clauses 24 to 28, wherein the fluoropolyether comprising the hydroxyl group and the hydrolyzable silyl group in step (iii) is reacted with (b) the fluorinated compound comprising the chlorine, bromine, or iodine bonded to the silicon atom.

Clause 32: The method of clause 31, wherein (b) the fluorinated compound comprising the chlorine, bromine, or iodine bonded to the silicon atom is represented by chemical structure (VIII):

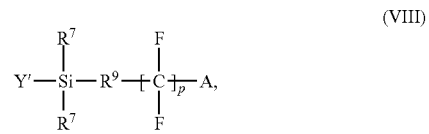

(VIII)

wherein p is a is a number from 1 to 8,
$R^9$ is an alkylene group as defined for $R^2$ in structure (I),
each $R^7$ is independently an alkyl group as defined for $R^4$ in structure (I),
Y' is chlorine, bromine, or iodine, and
A is $CF_3$ or $CF_2H$.

Clause 33: The method of any of clauses 24 to 28, wherein the fluoropolyether comprising the hydroxyl group and the hydrolyzable silyl group in step (iii) is reacted with (c) the anhydride compound comprising $CF_3$ groups, $CF_2H$ groups, or combinations thereof.

Clause 34: The method of clause 33, wherein (c) the anhydride compound comprising $CF_3$ groups, $CF_2H$ groups, or combinations thereof is represented by chemical structure (IX):

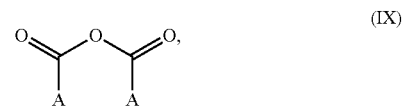

(IX)

wherein each A is independently $CF_3$ or $CF_2H$.

Clause 35: A coating composition comprising: (a) the fluoropolymer of any of clauses 1 to 23; and (b) a non-aqueous solvent.

Clause 36: The coating composition of clause 35, wherein the non-aqueous solvent comprises less than 50 weight % or less than 20 weight % or less than 5 weight % of water and up to 100 weight % of an organic solvent.

Clause 37: The coating composition of clauses 35 or 36, wherein the non-aqueous solvent comprises a fluorinated solvent.

Clause 38: The coating composition of any of clauses 35 to 37, wherein the fluoropolymer comprises an amount within a range from 0.01 weight % to 8 weight % of the coating composition based on the total weight of the coating composition.

Clause 39: The coating composition of any of clauses 35 to 38, further comprising an acid catalyst.

Clause 40: A substrate at least partially coated with a coating formed from the coating composition of any of clauses 35 to 39.

Clause 41: The substrate of clause 40, wherein the substrate is glass, polymethylmethacrylate, polycarbonate, polyethylene terephthalate, polyurea-urethane, polyamide, triacetate, cyclo olefin polymer, allyl diglycol carbonate, or a combination thereof.

Clause 42: The substrate of clauses 40 or 41, wherein the substrate forms at least a portion of an electronic device.

Whereas particular embodiments of this invention have been described above for purposes of illustration, it will be evident to those skilled in the art that numerous variations of the details of the present invention may be made without departing from the invention as defined in the appended claims.

The invention claimed is:

1. A fluoropolymer comprising fluoropolyether linkages, at least two ester linkages, and at least one hydrolyzable functional group, wherein the fluoropolymer is represented by chemical structure (I):

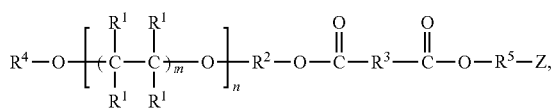

(I)

wherein m is a number from 1 to 4 and n is a number from 10 to 60, each $R^1$ is independently fluorine or $CF_3$, $R^2$ is an alkylene group, $R^3$ is an alkylene group in which one or more hydrogens of the alkylene group are optionally substituted with fluorine, $R^4$ is an alkyl group in which one or more hydrogens of the alkyl group are substituted with fluorine, $R^5$ is an alkylene group in which at least one hydrogen of the alkylene group is substituted with a group comprising $CF_3$, $CF_2H$, or a hydrolyzable silyl group, and Z is a group represented by chemical structure (II),

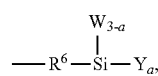

(II)

wherein a is 3, $R^6$ is an alkylene group that is interrupted by an oxygen atom, W is a $C_1$ to $C_4$ alkyl group, and Y is an alkoxy group.

2. The fluoropolymer of claim 1, wherein the alkylene group of $R^3$ is completely free of fluorine.

3. The fluoropolymer of claim 1, wherein all the hydrogens of the alkylene group of $R^3$ are substituted with fluorine.

4. The fluoropolymer of claim 1, wherein all the hydrogens of the alkyl group of $R^4$ are substituted with fluorine.

5. The fluoropolymer of claim 1, wherein the at least one hydrogen of the alkylene group of $R^5$ is substituted with a group represented by chemical structure (III):

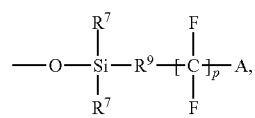

(III)

wherein p is a number from 1 to 8, $R^9$ is an alkylene group, each $R^7$ is independently an alkyl group, and A is $CF_3$ or $CF_2H$.

6. The fluoropolymer of claim 1, wherein the at least one hydrogen of the alkylene group of $R^5$ is substituted with a group represented by chemical structure (IV):

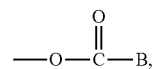

(IV)

wherein B is $CF_3$ or $CF_2H$.

7. The fluoropolymer of claim 1, wherein the at least one hydrogen of the alkylene group of $R^5$ is substituted with a group represented by chemical structure (V):

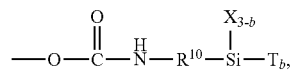

(V)

wherein b is a number from 1 to 3, $R^{10}$ is an alkylene group,

X is a $C_1$ to $C_4$ alkyl group, and

T is a hydrolyzable group.

8. The fluoropolymer of claim 1, wherein the fluoropolymer is completely free of siloxane units.

9. A coating composition comprising:

a) the fluoropolymer of claim 1; and b) a non-aqueous solvent.

10. The coating composition of claim 9, wherein the non-aqueous solvent comprises a fluorinated solvent.

11. The coating composition of claim 9, wherein the fluoropolymer comprises an amount within a range from 0.01 weight % to 8 weight % of the coating composition based on the total weight of the coating composition.

12. The coating composition of claim 9, further comprising an acid catalyst.

13. A substrate at least partially coated with a coating formed from the coating composition of claim 9.

14. The substrate of claim 13, wherein the substrate is glass, polymethylmethacrylate, polycarbonate, polyethylene terephthalate, polyurea-urethane, polyamide, triacetate, cyclo olefin polymer, allyl diglycol carbonate, or a combination thereof.

15. The substrate of claim 13, wherein the substrate forms at least a portion of an electronic device.

16. A fluoropolymer comprising fluoropolyether linkages, at least two ester linkages, and at least one hydrolyzable functional group, wherein the fluoropolymer is represented by chemical structure (I):

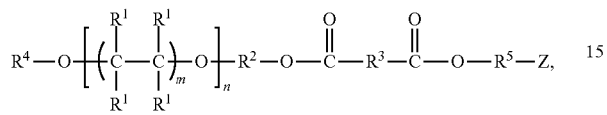
(I)

wherein m is a number from 1 to 4 and n is a number from 10 to 60,
each $R^1$ is independently fluorine or $CF_3$,
$R^2$ is an alkylene group,
$R^3$ is an alkylene group in which all the hydrogens of the alkylene group are substituted with fluorine,
$R^4$ is an alkyl group in which one or more hydrogens of the alkyl group are substituted with fluorine,
$R^5$ is an alkylene group in which at least one hydrogen of the alkylene group is substituted with a group comprising $CF_3$, $CF_2H$, or a hydrolyzable silyl group, and
Z is a group represented by chemical structure (II),

(II)

wherein a is a number from 1 to 3,
$R^6$ is an alkylene group that is interrupted by an oxygen atom,
W is a $C_1$ to $C_4$ alkyl group, and
Y is a hydrolyzable group.

17. A fluoropolymer comprising fluoropolyether linkages, at least two ester linkages, and at least one hydrolyzable functional group, wherein the fluoropolymer is represented by chemical structure (I):

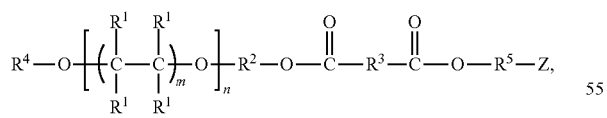
(I)

wherein m is a number from 1 to 4 and n is a number from 10 to 60,
each $R^1$ is independently fluorine or $CF_3$,
$R^2$ is an alkylene group,
$R^3$ is an alkylene group in which one or more hydrogens of the alkylene group are optionally substituted with fluorine,
$R^4$ is an alkyl group in which one or more hydrogens of the alkyl group are substituted with fluorine, Z is a group represented by chemical structure (II),

(II)

wherein a is a number from 1 to 3,
$R^6$ is an alkylene group that is interrupted by an oxygen atom,
W is a $C_1$ to $C_4$ alkyl group, and
Y is a hydrolyzable group, and
$R^5$ is an alkylene group in which at least one hydrogen of the alkylene group is substituted with a group represented by chemical structure (III), chemical structure (IV), or chemical structure (V):

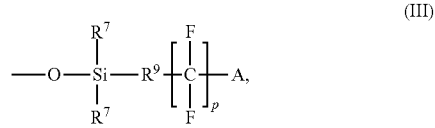
(III)

wherein p is a number from 1 to 8,
$R^9$ is an alkylene group,
each $R^7$ is independently an alkyl group, and
A is $CF_3$ or $CF_2H$;

(IV)

wherein B is $CF_3$ or $CF_2H$;

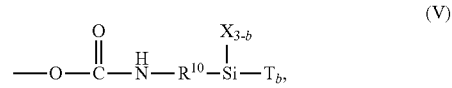
(V)

wherein b is a number from 1 to 3,
$R^{10}$ is an alkylene group,
X is a $C_1$ to $C_4$ alkyl group, and
T is a hydrolyzable group.

18. An electronic device at least partially coated with a coating formed from a coating composition comprising:
(a) a non-aqueous solvent; and
(b) a fluoropolymer comprising fluoropolyether linkages, at least two ester linkages, and at least one hydrolyzable functional group, wherein the fluoropolymer is represented by chemical structure (I):

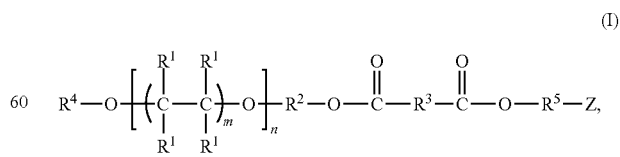
(I)

wherein m is a number from 1 to 4 and n is a number from 10 to 60,
each $R^1$ is independently fluorine or $CF_3$,
$R^2$ is an alkylene group, $R^3$ is an alkylene group in which one or more hydrogens of the alkylene group are optionally substituted with fluorine,
$R^4$ is an alkyl group in which one or more hydrogens of the alkyl group are substituted with fluorine,
$R^5$ is an alkylene group in which at least one hydrogen of the alkylene group is substituted with a group comprising $CF_3$, $CF_2H$, or a hydrolyzable silyl group, and
Z is a group represented by chemical structure (II),

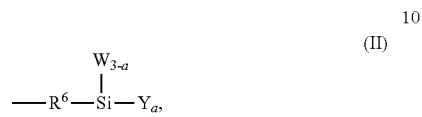

(II)

wherein a is a number from 1 to 3,
$R^6$ is an alkylene group that is interrupted by an oxygen atom,
W is a $C_1$ to $C_4$ alkyl group, and
Y is a hydrolyzable group.

* * * * *